United States Patent
Kitagoh (10) Patent No.: US 10,095,199 B2
(45) Date of Patent: Oct. 9, 2018

(54) ENERGY CONSUMPTION PREDICTING DEVICE FOR ROLLING LINE

(71) Applicant: TOSHIBA MITSUBISHI-ELECTRIC INDUSTRIAL SYSTEMS CORPORATION, Chuo-ku (JP)

(72) Inventor: Kazutoshi Kitagoh, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 272 days.

(21) Appl. No.: 15/110,331

(22) PCT Filed: Jan. 24, 2014

(86) PCT No.: PCT/JP2014/051559
§ 371 (c)(1),
(2) Date: Jul. 7, 2016

(87) PCT Pub. No.: WO2015/111199
PCT Pub. Date: Jul. 30, 2015

(65) Prior Publication Data
US 2016/0327919 A1    Nov. 10, 2016

(51) Int. Cl.
*B21B 37/00* (2006.01)
*B21B 38/00* (2006.01)
(Continued)

(52) U.S. Cl.
CPC ............ *G05B 13/048* (2013.01); *B21B 37/00* (2013.01); *B21B 99/00* (2013.01); *G05B 13/042* (2013.01);
(Continued)

(58) Field of Classification Search
None
See application file for complete search history.

(56) References Cited

U.S. PATENT DOCUMENTS

| | | | |
|---|---|---|---|
| 6,782,304 B1* | 8/2004 | Tsugeno | B21B 37/16 700/149 |
| 2005/0131572 A1* | 6/2005 | Broese | B21B 37/76 700/148 |
| 2015/0034268 A1* | 2/2015 | Seidel | B21B 1/466 164/462 |

FOREIGN PATENT DOCUMENTS

| | | |
|---|---|---|
| JP | 3444267 B2 | 9/2003 |
| JP | 2012-170962 A | 9/2012 |
| JP | 2012-170963 A | 9/2012 |

OTHER PUBLICATIONS

International Search Report dated Apr. 15, 2014, in PCT/JP2014/051559 Filed Jan. 24, 2014.
(Continued)

*Primary Examiner* — Paul Yanchus, III
(74) *Attorney, Agent, or Firm* — Oblon, McClelland, Maier & Neustadt, L.L.P.

(57) ABSTRACT

The present invention includes (1) inputting, into a model expression that defines relation between various operating values of a facility operating on a material to be rolled and energy consumption of the facility, various actual operating values as the various operating values, to calculate an actual calculation value of the energy consumption; (2) dividing the actual value of the energy consumption by the actual calculation value to calculate a reference learning value of the energy consumption; (3) inputting the set operating value defined by the setting calculation unit only in one operating value, among various operating values of the model expression, while inputting the actual operating values collected by the actual value unit in other operating values to calculate a pseudo-actual calculation value of the energy consumption; (4) dividing the actual calculation value by the pseudo-actual calculation value to calculate a correction learning value; and (5) inputting the various set
(Continued)

operating values as the various operating values of the model expression to calculate a prediction value of the energy consumption for the material to be rolled, which is scheduled to be conveyed to the rolling line next time or later, and multiplies the prediction value by the reference learning value and the correction learning value to calculate a corrected prediction value of the energy consumption.

5 Claims, 8 Drawing Sheets (51) Int. Cl.
  *G05B 13/04* (2006.01)
  *B21B 99/00* (2006.01)
  *G05B 17/02* (2006.01)
  *B21B 37/46* (2006.01)
(52) U.S. Cl.
  CPC .............. *G05B 17/02* (2013.01); *B21B 37/46* (2013.01); *G05B 2219/23102* (2013.01); *G05B 2219/49065* (2013.01)

(56) References Cited

OTHER PUBLICATIONS

English translation of the International Preliminary Report on Patentability and Written Opinion dated Aug. 4, 2016 in PCT/JP2014/051559 filed Jan. 24, 2014.

\* cited by examiner

ENERGY CONSUMPTION PREDICTING DEVICE FOR ROLLING LINE

TECHNICAL FIELD

The present invention relates to an energy consumption predicting device for a rolling line.

BACKGROUND ART

Rolling lines include various facilities for rolling materials to be rolled to manufacture products. Energy consumption predicting devices for rolling lines calculate energy consumption needed for manufacturing products of desired sizes and qualities in the rolling lines.

For example, Patent Literature 1 discloses calculation of energy consumption of a rolling stand, which is one of the facilities, by using roll torque or roll velocity. Patent Literature 2 discloses higher-accuracy prediction of energy consumption of a rolling stand by using learning calculation of energy consumption.

CITATION LIST

Patent Literature

Patent Literature 1
  Japanese Patent No. 3444267
Patent Literature 2
  Japanese Patent Laid-Open No. 2012-170962

SUMMARY OF INVENTION

Technical Problem

In the technique of Patent Literature 2, energy consumption is predicted by inputting various set operating values into a model expression that defines the relation between various operating values and energy consumption of the rolling stand. Various actual operating values are acquired from the rolling stand which operated based on various set operating values. Based on various actual operating values, actual values of energy consumption are acquired. Various actual operating values are input into a model expression to calculate an actual calculation value of the energy consumption. By comparing the actual values with the actual calculation value, a learning value is calculated. The learning value is reflected upon the energy consumption calculated by the aforementioned model expression so as to predict energy consumption to be consumed by a next material.

The various operating values of the facilities such as the rolling stand include two or more types of values, such as roll torque and roll velocity. Accordingly, or more types of parameters are included in the model expression as various operating values. In the technique of Patent Literature 2, an actual calculation value of energy consumption is calculated by inputting all the various actual operating values as the various operating values of the model expression.

In this case, however, it is unclear which parameter exerts an influence on prediction error in the model expression. For example, it cannot be taken into consideration which error has more influence on energy consumption, an error between a set operating value and an actual operating value of the roll torque, or an error between a set operating value and an actual operating value of the roll velocity. Consideration of difference in influence caused by difference in parameter is expected to contribute to prediction of energy consumption at higher accuracy.

The facilities arranged in the rolling line include a winder and a conveying table in addition to the rolling stand. It is also desired that energy consumption of these facilities can be calculated.

The present invention has been made in order to solve the above-stated problems, and it is therefore an object of the present invention to provide an energy consumption predicting device for a rolling line capable of predicting energy consumption of the rolling line at high accuracy before products are produced in actuality.

Solution to Problem

An embodiment is an energy consumption predicting device for a rolling line having a facility operating on a material to be rolled, the device comprising:

a setting calculation unit configured to define various set operating values of the facility based on operating conditions corresponding to the material to be rolled;

an actual value collection unit configured to collect various actual operating values with respect to a result of operation of the facility based on the various net operating values;

an actual energy consumption value acquisition unit configured to integrate the various actual operating values, with a section where the facility operates on the material to be rolled being used as an integration section, to acquire an actual value of energy consumption;

an actual energy consumption calculation unit configured to input, into a model expression that defines relation between the various operating values of the facility and energy consumption of the facility, the various actual operating values as the various operating values, to calculate an actual calculation value of the energy consumption;

an energy consumption learning value calculation unit configured to divide the actual value by the actual calculation value to calculate a reference learning value of the energy consumption;

a pseudo-actual energy consumption calculation unit configured to input the set operating value defined by the setting calculation unit only in one operating value, among various operating values of the model expression, while inputting the actual operating values collected by the actual value collection unit in other operating values to calculate a pseudo-actual calculation value of the energy consumption; and a correction learning value calculation unit configured to divide the actual calculation value by the pseudo-actual calculation value to calculate a correction learning value, wherein the setting calculation unit inputs the various set operating values as the various operating values of the model expression to calculate a prediction value of the energy consumption for the material to be rolled, which is scheduled to be conveyed to the rolling line next time or later, and multiplies the prediction value by the reference learning value and the correction learning value to calculate a corrected prediction value of the energy consumption.

In one instance, the facility is a rolling stand having rollers for rolling the material to be rolled, and the various operating values of the model expression include roll torque and roll velocity of the rollers.

In another instance, the facility is a winder, and the various operating values of the model expression include tension and velocity of the material to be rolled.

In another instance, the facility is a conveying table, and the various operating values of the model expression include conveying velocity of the material to be rolled and conveying time of the material to be rolled.

Advantageous Effects of Invention

According to the present invention, it becomes possible to predict the energy consumption of the rolling line at high accuracy before products are produced in actuality. As a result, it becomes possible to implement efficient production control, such as performing production of products, which involves large energy consumption, in a time period of the day when sufficient power is available.

DESCRIPTION OF EMBODIMENTS

Hereinafter, embodiments of the present invention will be described in details with reference to the drawings. Note that identical component members in each of the drawings are designated by identical reference signs to omit redundant description.

First Embodiment

[System Configuration of First Embodiment]

Figure 1:
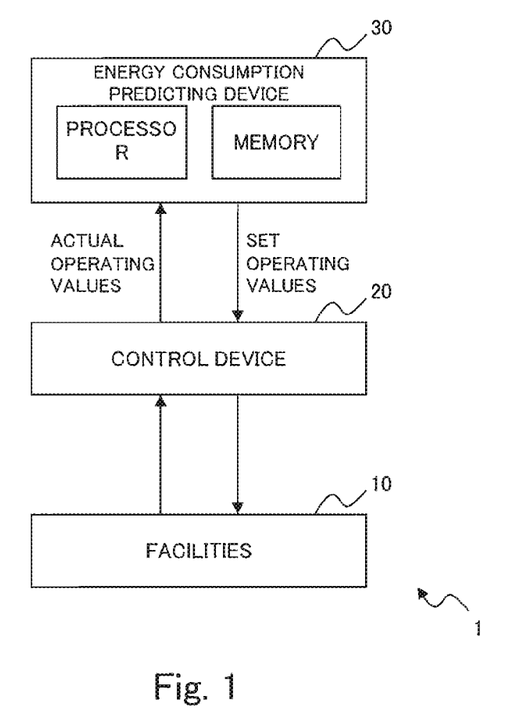
FIG. 1 is a concept view illustrating an entire system in the first embodiment of the present invention.

FIG. 1 is a concept view illustrating an entire system in the first embodiment of the present invention.

A rolling line 1 for rolling materials to be rolled (such as slabs and metal materials) includes various kinds of facilities 10, a control device 20, and an energy consumption predicting device 30. The energy consumption predicting device 30 includes an arithmetic device (a processor) and a memory.

Examples of the various kinds of facilities 10 include a rolling stand, a winder, and a conveying table. The various kinds of facilities 10 include an actuator and a sensor. The actuator includes rollers operating on a material to be rolled and a motor that drives the rollers. The motor is operated based on an input signal corresponding to a set operating value. The sensor outputs signals corresponding to various actual operating values with respect to the result of the facilities 10 operating on the material to be rolled based on various set operating values.

The control device 20 is connected with the facilities 10 to monitor and control the facilities 10. The control device 20 outputs signals corresponding to various set operating values to the facilities 10. The control device 20 inputs signals corresponding to various actual operating values of the facilities 10.

The energy consumption predicting device 30 is connected with the control device 20 and outputs various set operating values that signify operation targets of the facilities 10. The energy consumption predicting device 30 inputs various actual operating values that signify operation results of the facilities 10.

Figure 2:
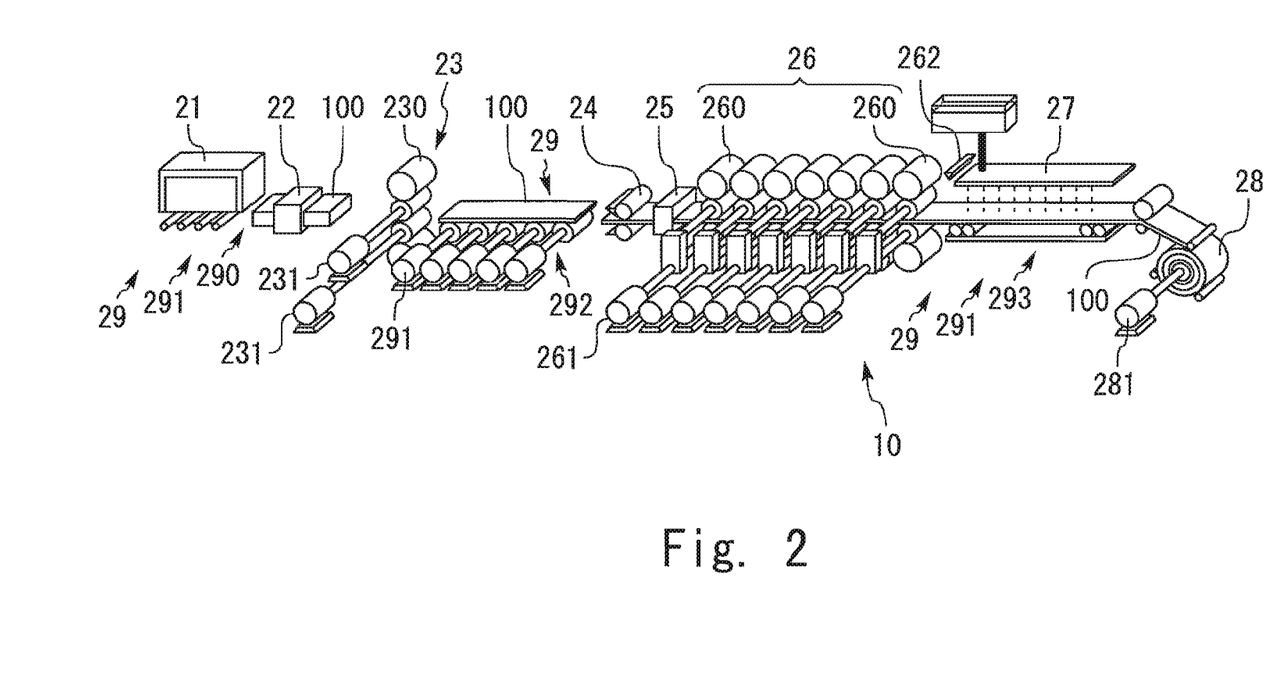
FIG. 2 is a layout view of the facilities of the rolling line 1 which are targets of energy consumption prediction by the energy consumption predicting device 30.

FIG. 2 is a layout view of the facilities of the rolling line 1 which are targets of energy consumption prediction by the energy consumption predicting device 30.

The rolling line 1 is a hot rolling line. The hot rolling line illustrated in FIG. 2 includes a heating furnace 21, a roughing mill 23, a finishing mill 26, a winder 28, and a conveying table 29.

A material to be rolled 100 conveyed from the heating furnace 21 is rolled by the roughing mill 23 of a reversible type. The roughing mill 23 generally has one to several rolling stands 230. The roughing mill 23 rolls the material to be rolled 100 by making the material to be rolled 100 reciprocally pass the rolling stand 230 several times, so that a target intermediate bar thickness is achieved at the outlet side of the roughing mill 23. Hereinafter, passing of the material to be rolled 100 through the rolling stand 230 of the roughing mill 23 is expressed as "pass".

After rolled by the roughing mill 23, the material to be rolled 100 is conveyed from the outlet side of the roughing mill 23 to the inlet side of the finishing mill 26, and is rolled to a desired product board thickness by the finishing mill 26 which has, for example, five to seven rolling stands 260. The material to be rolled 100 conveyed from the finishing mill 26 is cooled with a cooling device 27, such as a water cooler, and is then wound up into a coil by the winder 28.

The rollers of the rolling stand 230 in the roughing mill 23 are driven by a motor 231. The rollers of the rolling stand 260 in the finishing mill 26 are driven by a motor 261. For example, the motors 231 and 261 are high power motors of 5000 to 11000 [kW]. The energy consumption of the motors during rolling operation varies depending on sizes and steel types of the materials to be rolled.

The winder 28 is a down coiler. The winder 28 is driven by a motor 281. The conveying table 29 includes a roughing mill conveying table 290, a roughing-to-finishing conveying table 292, and a run out table 293. The rollers of the conveying table 29 are driven by a plurality of motors 291.

At the outlet side of the finishing mill 26, a finishing mill outlet-side measuring instrument 262 is provided. The finishing mill outlet-side measuring instrument 262 continuously measures a board thickness, a board width, temperature, and the like of the conveyed material to be rolled 100. Measurement values are used to confirm the quality of products online and to implement feedback control. The finishing mill outlet-side measuring instrument 262 may be an instrument having a board thickness meter and a board width meter separately mounted, or may be a single instrument which can measure both the board thickness and the board width.

In addition, a roughing mill inlet-side descaler 22 is arranged at the inlet side of the roughing mill 23. A finishing mill inlet-side descaler 25 is arranged at the inlet side of the finishing mill 26. A crop cut shear 24 is arranged in a conveyance table area between the roughing mill 23 and the finishing mill 26.

[Configuration of Energy Consumption Predicting Device 30]

Figure 3:
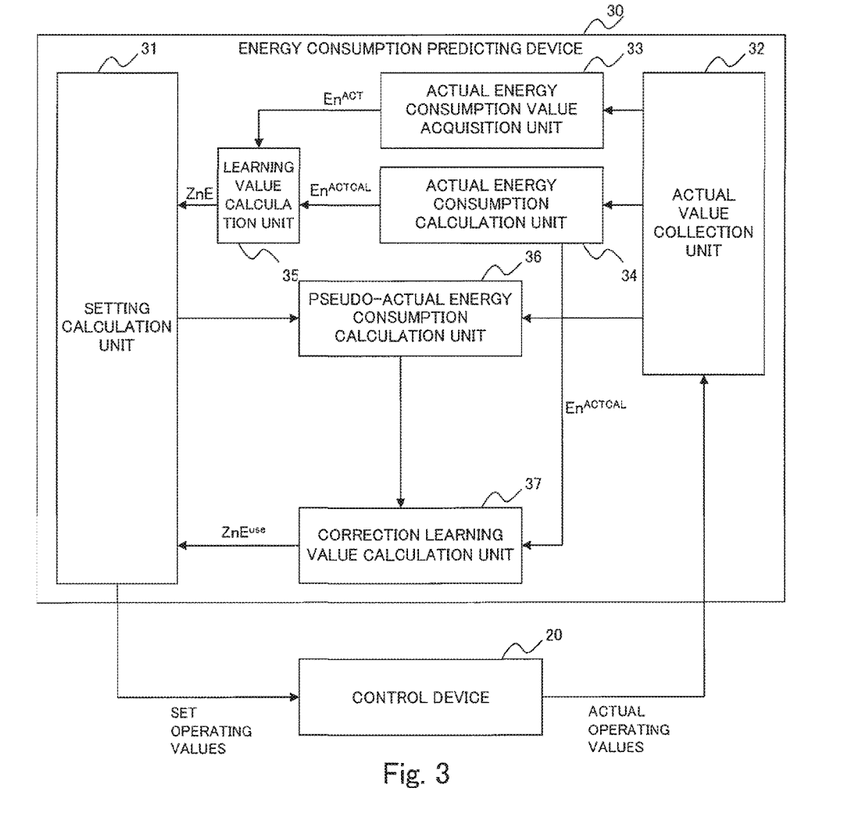
FIG. 3 is a schematic view illustrating the configuration of the energy consumption predicting device 30 according to the first embodiment of the present invention.

FIG. 3 is a schematic view illustrating the configuration of the energy consumption predicting device 30 according to the first embodiment of the present invention.

The energy consumption predicting device 30 is a device for predicting the energy consumption of the facilities 10. The facilities 10 illustrated in FIG. 1 include the rolling stand 230 of the roughing mill 23, the rolling stand 260 of the finishing mill 26, the winder 28, and the conveying table 29.

As illustrated in FIG. 3, the energy consumption predicting device 30 includes a setting calculation unit 31, an actual value collection unit 32, an actual energy consumption value acquisition unit 33, an actual energy consumption calculation unit 34, a learning value calculation unit 35, a pseudo-actual energy consumption calculation unit 36, and a correction learning value calculation unit 37. The memory illustrated in FIG. 1 stores a program describing detailed processing of the respective units illustrated in FIG. 3. The respective units illustrated in FIG. 3 are implemented when the program is loaded from the memory and executed by the arithmetic device illustrated in FIG. 1.

The setting calculation unit 31 defines various set operating values $A^{SET}$ of the facilities 10 based on the operating conditions corresponding to the material to be rolled 100.

The actual value collection unit 32 collects various actual operating values $A^{ACT}$ with respect to a result of the facilities 10 operating based on the various set operating values $A^{SET}$. The various actual operating values $A^{ACT}$ include statuses of the material to be rolled (temperature, board width, board thickness, etc.), and actual operating values (current consumption, power consumption, roll torque, roll velocity, rolling load, etc.) of the actuator.

The actual energy consumption value acquisition unit 33 integrates various actual operating values collected in an integration section to acquire an actual value $En^{ACT}$ of the energy consumption, the integration section being a section where the facilities 10 operate on the material to be rolled 100.

The actual energy consumption calculation unit 34 inputs, into a model expression that defines relation between various operating values of the facilities 10 and energy consumption of the facilities 10, the various actual operating values $A^{ACT}$ as the various operating values, to calculate an actual calculation value $En^{ACTCAL}$ of the energy consumption.

The learning value calculation unit 35 divides the actual value $En^{ACT}$ by the actual calculation value $En^{ACTCAL}$ to calculate a reference learning value $ZnE$ of the energy consumption.

The pseudo-actual energy consumption calculation unit 36 inputs the set operating value $A^{SET}$ defined by the setting calculation unit 31 only in one operating value, among various operating values of the aforementioned model expression, while inputting the actual operating values $A^{ACT}$ collected by the actual value collection unit 32 in other operating values to calculate a pseudo-actual calculation value $En^{PseudoACTCAL}$ of the energy consumption.

The correction learning value calculation unit 37 divides the actual calculation value $En^{ACTCAL}$ by the pseudo-actual calculation value $En^{PseudoACTCAL}$ to calculate a correction learning value.

The aforementioned setting calculation unit 31 multiplies the reference learning value $ZnE$ by the correction learning value to calculate a corrected learning value $ZnE^{use}$. The setting calculation unit 31 then inputs the various set operating values $ASET$ as the aforementioned various operating values of the model expression to calculate a prediction value of the energy consumption for a material to be rolled, which is scheduled to be conveyed to the rolling line 1 next time or later. The setting calculation unit 31 multiplies the prediction value by the corrected learning value $ZnE^{use}$ to calculate a corrected prediction value $En^{CALSET}$ of the energy consumption.

[Prediction Calculation of Energy Consumption with Respect to Rolling Stand]

Various kinds of facilities 10 of the rolling line 1 include a rolling stand of the roughing mill 23, a rolling stand of the finishing mill 26, the winder 28, and the conveying table 29. In the present embodiment, prediction calculation of the energy consumption with respect to the rolling stand will be described.

In the rolling stand, rolling power may drastically change due to fluctuation of tension caused by biting of a down coiler, tail out of a previous stand, and the like. Accordingly, it is difficult to predict energy consumption only by setting calculation. It is therefore necessary to correct such errors and to enhance the accuracy of prediction calculation.

For the prediction calculation of the energy consumption of the hot rolling line, set operating values calculated by setting calculation are used. Based on the set operating values, such as roll torque and roll velocity, and on the operating conditions, a prediction value of the energy consumption in the rolling stand can be calculated.

The setting calculation unit 31 predicts the energy consumption by using model expressions. A calculation value $En^{CAL}$ of the energy consumption of the motor which drives the rolls of each rolling stand can be calculated as expressed in Expressions (1) and (2). The calculation value $En^{CAL}$ is obtained by integrating a product of roll torque G(t) [kNm] and roll velocity v(t) [m/s] by time (t) [s].

$$Pwn_i^{CAL} = (1000 \times Vn_i^{CAL} \times Gn_i^{CAL})/Rn \tag{1}$$

$$En^{CAL} = \Sigma (Pwn_i^{CAL} + Pwn_{i+1}^{CAL}) \times Sn_i^{CAL}/2 \tag{2}$$

In the above expressions, a subscript n represent a stand number (or the number of rolling passes). A subscript i is an aim point number. $Sn_i^{CAL}$ [s] expresses time [s] from the aim point i to i+1. A symbol $\Sigma$ represents a sum total from the first aim point to the last aim point.

In Expression (1), $Vn_i^{CAL}$ at aim point i is a set operating value of roll velocity. $Gn_i^{CAL}$ is a set operating value of roll torque at aim point i. $Pwn_i^{CAL}$ is a calculation value of rolling power applied to the material to be rolled at aim point i. Rn [mm] is a roll radius. The aim point signifies a typical position of the material to be rolled. For example, in the case of determining a gap of the rolls at the time of biting the material to be rolled, the prediction accuracy of a tip portion is important. Accordingly, the tip position is set as one of the aim points, and information (such as board thickness, board width, and temperature) on the inlet-side of the tip portion is used to predict load, torque, and the like.

In the end, a prediction value $En^{CALSET}$ of the energy consumption can be calculated by using a later-described corrected learning value $ZnE_{use}$ as expressed in Expression (3).

$$En^{CALSET} = ZnE^{use} \times En^{CAL} \qquad (3)$$

Figure 4:
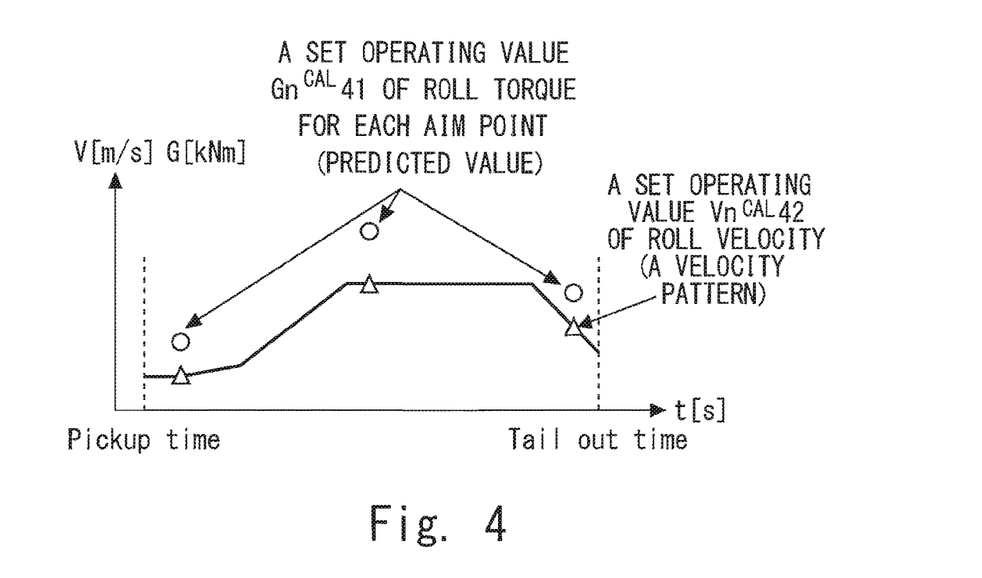
FIG. 4 illustrates one example of set operating values of the rolling stand.
Figure 5:
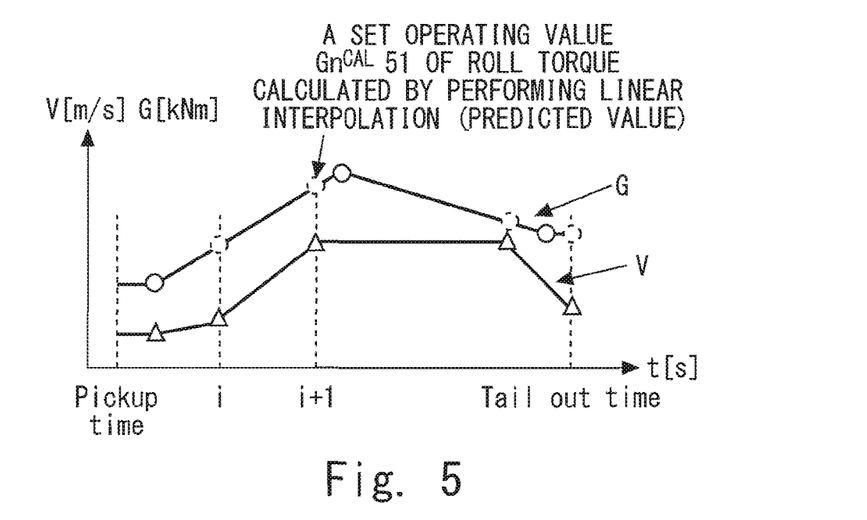
FIG. 5 illustrates a set operating value $Gn^{CAL}51$ of roll torque calculated by performing linear interpolation.

Setting calculation of the set operating values in the setting calculation unit 31 will be described. FIG. 4 illustrates one example of set operating values of the rolling stand. As illustrated in FIG. 4, a set operating value $Gn^{CAL}$41 of roll torque is defined for each aim point position under each operating condition. By setting calculation, the set operating value at each aim point position can be predicted. This position is identical to the position where load prediction, which is necessary for calculating a set gap, is performed. In the case of a set operating value $Vn^{CAL}$42 of roll velocity, a velocity pattern thereof is defined for the overall length of the material to be rolled. When the aim point positions are different between the roll torque and the roll velocity, the set operating value of the roll torque can be calculated by performing linear interpolation in setting calculation. FIG. 5 illustrates a set operating value $Gn^{CAL}$51 of roll torque calculated by performing linear interpolation. By performing linear interpolation in accordance with the prediction positions of the velocity pattern, the set operating value $Gn^{CAL}$51 of the roll torque can be calculated. As a result, a set operating value of the roll torque at a specified aim point can be acquired.

The set operating values of the roll torque and the set operating values of the roll velocity required for setting calculation of the set operating values are prestored in the memory for each operating condition.

A description is now given of learning calculation. Learning calculation is executed after the material to be rolled is rolled and wound up by the winder 28.

The actual value collection unit 32 acquires actual operating values for the overall length of the material to be rolled. The actual operating values are values obtained as a result of operating the facilities 10 based on the set operating values. In the case of the rolling stand, as expressed in Expression (1), various actual operating values include a roll diameter, roll torque, and roll velocity. Although rolls wear and expand during rolling operation, a change in the roll diameter is marginal. Accordingly, a fixed value defined in setting calculation may satisfactorily be used as the roll diameter.

Figure 6:
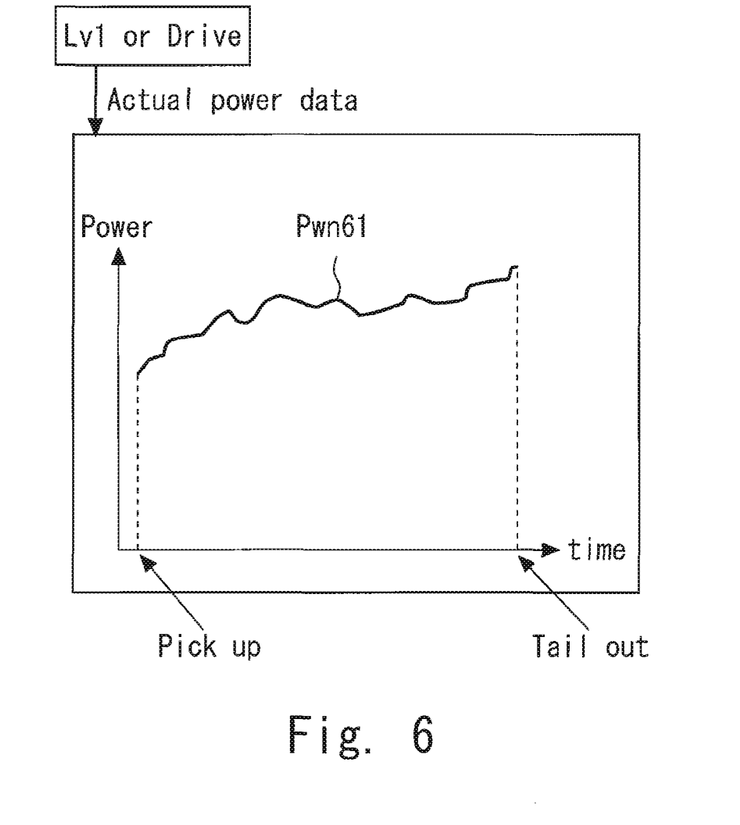
FIG. 6 illustrates a relationship between an actual value of the energy consumption and a rolling power.

The actual energy consumption value acquisition unit 33 integrates actual operating values to acquire an actual value $En^{ACT}$ of the energy consumption. For example, the actual value $En^{ACT}$ of the energy consumption of the motor which drives the rolls of each rolling stand can be calculated by time-integrating rolling power Pwn61 as illustrated in FIG. 6. This can be expressed by Expression (4):

$$En^{ACT} = \eta \int Pwn(t)dt \qquad (4)$$

When the rolling power is not directly picked up, the rolling power calculated based on the roll torque and the roll velocity is used as follows. That is, the actual value $En^{ACT}$ of the energy consumption can be calculated by integrating a product of roll torque Gn(t) [kNm] and roll velocity Vn(t) [m/s] by time (t) [s].

$$Pwn(t) = (1000 \times Vn(t) \times Gn(t))/Rn \qquad (5)$$

Figure 7:
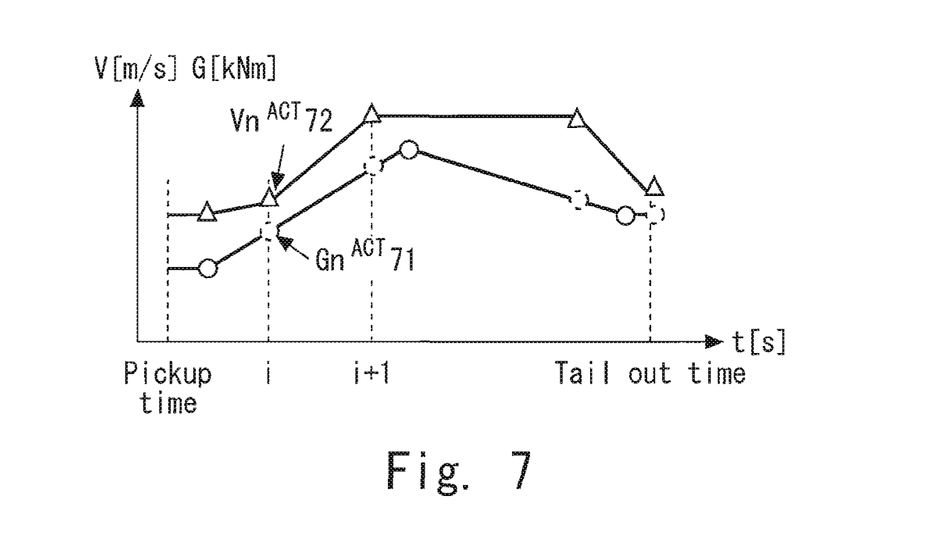
FIG. 7 illustrates one example of actual calculation values of the energy consumption.

The actual energy consumption calculation unit 34 uses Expressions (6) and (7), which are model expressions same as those (Expressions (1) and (2)) for setting calculation, to calculate an actual calculation value $En^{ACTCAL}$ of the energy consumption by substituting actual operating values in input parameters of the model expressions. Specifically, an actual value $Gn_i^{ACT}$ of roll torque and an actual value $Vn_i^{ACT}$ of roll velocity are substituted in the input parameters of the model expressions to calculate a rolling power $Pwn_i^{ACTCAL}$. The calculated rolling power $Pwn_i^{ACTCAL}$ is then integrated to obtain the actual calculation value $En^{ACTCAL}$ of the energy consumption. FIG. 7 illustrates one example of actual calculation values of the energy consumption. When an aim point i of an actual value $Gn^{ACT}$71 of the roll torque is different in position from an aim point i of an actual value $Vn^{ACT}$72 of the roll velocity, a linear-interpolated value as illustrated in FIG. 7 is used.

$$Pwn_i^{ACTCAL} = (1000 \times Vn_i^{ACT} \times Gn_i^{ACT})/Rn \qquad (6)$$

$$En^{ACTCAL} = \Sigma(Pwn_i^{ACTCAL} + Pwn_{i+1}^{ACTCAL}) \times Sn_i^{ACT}/2 \qquad (7)$$

The learning value calculation unit 35 compares the actual value $En^{ACT}$ of the energy consumption acquired by the actual energy consumption value acquisition unit 33 with the actual calculation value $En^{ACTCAL}$ of the energy consumption calculated by the actual energy consumption calculation unit 34, and calculates a reference learning value ZnE of the energy consumption as expressed in Expression (8):

$$ZnE = En^{ACT}/En^{ACTCAL} \qquad (8)$$

The pseudo-actual energy consumption calculation unit 36 uses the set operating value defined by the setting calculation unit 31 only for one parameter of the aforementioned model expression while using the actual operating values collected by the actual value collection unit 32 for other parameters to calculate a pseudo-actual calculation value $En^{PseudoACTCAL}$ of the energy consumption. For example, in the case of using the set operating value only for the roll torque and using the actual operating value for the roll velocity, the energy consumption is expressed as in Expressions (9) and (10):

$$Pwn_i^{PseudoACTCAL\_G} = (1000 \times Vn_i^{ACT} \times Gn_i^{CAL})/Rn \qquad (9)$$

$$En^{PseudoACTCAL\_G} = \Sigma(Pwn_i^{PseudoACTCAL\_G} = Pwn_{i+1}^{PseudoACTCAL\_G}) \times Sn_i^{ACT}/2 \qquad (10)$$

Figure 8:
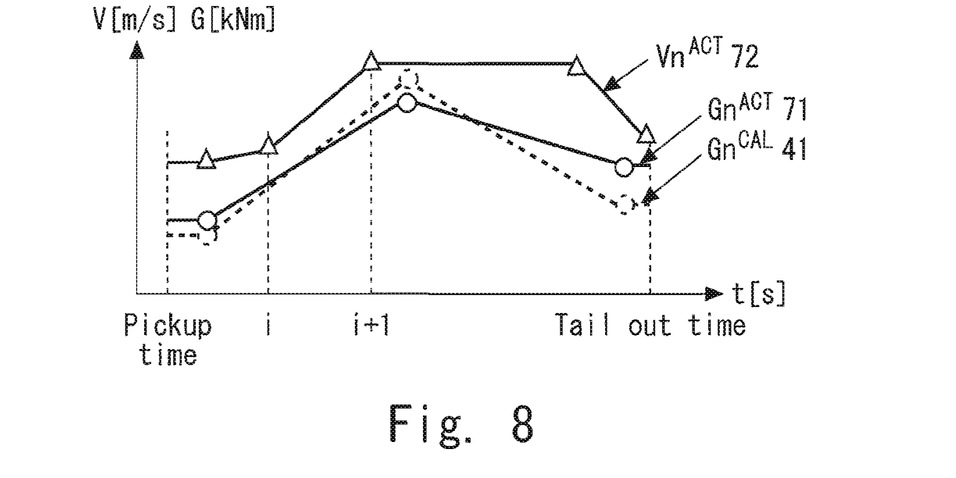
FIG. 8 illustrates one example of pseudo-actual calculation values of the energy consumption.

FIG. 8 illustrates one example of pseudo-actual calculation values of the energy consumption. Difference between a set operating value $Gn^{CAL}$41 which are prediction value of the roll torque and an actual operating value $Gn^{ACT}$71 is not fixed but is constantly variable with respect to the overall length. In order to absorb an error corresponding to this difference, the set operating value $Gn^{CAL}$41 defined by the setting calculation unit 31 is used only for one parameter that is roll torque.

The correction learning value calculation unit 37 compares the actual calculation value $En^{ACTCAL}$ of the energy consumption calculated by the actual energy consumption calculation unit 34 with the pseudo-actual calculation value $En^{PseudoACTCAL}$ of the energy consumption calculated by the pseudo-actual energy consumption calculation unit 36, to calculate a correction learning value of the energy consumption. For example, in the case of using the set operating value only for the roll torque and using the actual operating value for the roll velocity, the energy consumption is expressed as in Expression (11):

$$ZnE(G) = En^{ACTCAL}/En^{PseudoACTCAL\_G} \qquad (11)$$

The setting calculation unit 31 calculates a corrected learning value $ZnE^{use}$ by multiplying the reference learning value ZnE by the correction learning value ZnE(G) as expressed in Expression (12):

$$ZnE^{use}=ZnE \times ZnE(G) \qquad (12)$$

The setting calculation unit 31 then inputs the various set operating values as the aforementioned various operating values of the model expressions to calculate a prediction value EnCAL of the energy consumption for the material to be rolled, which is scheduled to be conveyed to the rolling line 1 next time or later. As expressed in Expression (3), the setting calculation unit 31 multiplies the prediction value $En^{CAL}$ by the corrected learning value $ZnE^{use}$ to calculate a corrected prediction value $En^{CALSET}$ of the energy consumption.

When the model expression for calculating energy consumption has two or more parameters, the parameters may be used in combination. This makes it possible to achieve further enhancement of the prediction accuracy.

For example, in the case where the pseudo-actual energy consumption calculation unit 36 uses the set operating value only for the roll velocity and using the actual operating value for the roll torque, the energy consumption is expressed as in Expressions (13) and (14):

$$Pwn_i^{PseudoACTCAL\_V}=(1000 \times Vn_i^{CAL} \times Gn_i^{ACT})/Rn \qquad (13)$$

$$En^{PseudoACTCAL\_V}=\Sigma(Pwn_i^{PseudoACTCAL\_V}+Pwn_{i+1}^{Pseu-doACTCAL\_V}) \times Sn_i^{iACT}/2 \qquad (14)$$

In this case, the correction learning value calculation unit 37 calculates a correction learning value ZnE(V) as in Expression (15):

$$ZnE(V)=En^{ACTCAL}/En^{PseudoACTCAL\_V} \qquad (15)$$

In the end, the corrected learning value $ZnE^{use}$ of the energy consumption is calculated in Expression (16) in combination with a correction learning value ZnE(G) which is obtained by using the roll torque as a set operating value and a correction learning value ZnE(V) which is obtained by using the roll velocity as a set operating value. The corrected learning value $ZnE^{use}$ is then applied to calculation of a prediction value $En^{CALSET}$ of the energy consumption for a next material:

$$ZnE^{use}=ZnE \times ZnE(G) \times ZnE(V) \qquad (16)$$

It is preferable to weight ZnE(G) and ZnE(V).

Second Embodiment

[System Configuration of Second Embodiment]

Figure 9:
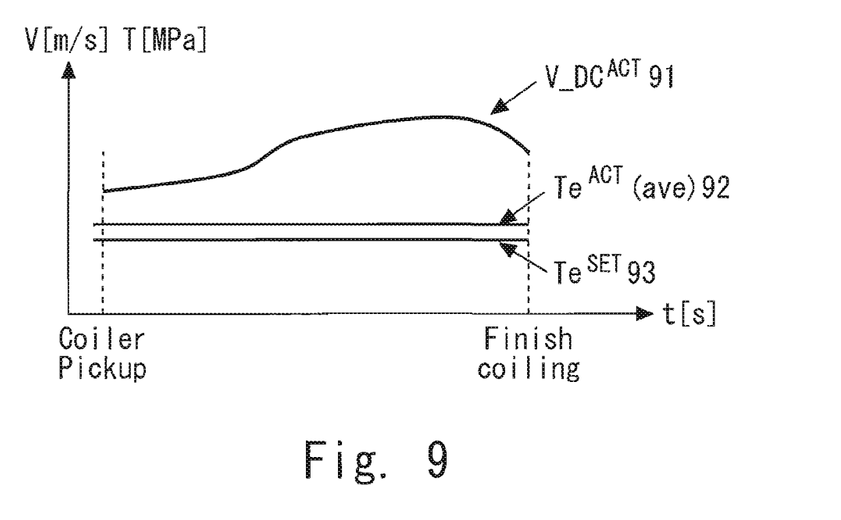
FIG. 9 illustrates one example of set operating values and actual operating values with respect to the winder 28.

Now, a second embodiment of the present invention will be described with reference to FIG. 9. The system configuration in a system of the present embodiment is similar to the configuration illustrated in FIGS. 1 to 3. Since the principal concept of the energy consumption predicting device 30 is similar to the principal concept described in the first embodiment, a detailed description is omitted.

[Prediction Calculation of Energy Consumption with Respect to Winder]

Various kinds of facilities 10 of the rolling line 1 include a rolling stand of the roughing mill 23, a rolling stand of the finishing mill 26, the winder 28, and the conveying table 29. In the present embodiment, prediction calculation of the energy consumption with respect to the winder 28 that is a down coiler will be described.

The setting calculation unit 31 defines various set operating values of the winder 28 based on the operating conditions corresponding to the material to be rolled. In the down coiler, the material to be rolled is wound up while the tension between the down coiler and pinch rollers provided on the inlet side of the down coiler is regulated. The various set operating values of the winder 28 are defined for each aim point position under each operating condition. Various set operating values required for setting calculation of the set operating values are prestored in the memory for each operating condition. For a tip portion and a tail end portion of the material, a tension target value which is one of the set operating values may be changed to arrange a winding shape.

The setting calculation unit 31 predicts the energy consumption by inputting the set operating values in model expressions. A calculation value $E\_DC^{CAL}$ of the energy consumption of a motor which drives the winder 28 is calculated as expressed in Expressions (17) and (18):

$$Pw\_DC_i^{CAL}=10 \times Te^{CAL} \times h^{CAL} \times w^{CAL} \times V\_DC_i^{CAL} \qquad (17)$$

$$E\_DC^{CAL}=\Sigma(Pw\_DC_i^{CAL}+Pw\_DC_{i+1}^{CAL}) \times S\_DC_i^{CAL}/2 \qquad (18)$$

where i is an aim point position number, Te is tension [Mpa], h is a board thickness [mm], w is a board width [mm], $V\_DC_i$ is velocity [m/s] of the material to be rolled at aim point i, and $S\_DC_i$ is time [s] from aim point i to i+1.

In the end, a prediction value $E\_DC^{CALSET}$ of energy consumption can be calculated by using a later-described corrected learning value $ZE\_DC^{use}$ as expressed in Expression (19):

$$E\_DC^{CALSET}=ZE\_DC^{use} \times E\_DC^{CAL} \qquad (19)$$

A description is now given of learning calculation. Learning calculation is executed after the material to be rolled is rolled and is wound up by the winder 28.

The actual value collection unit 32 acquires actual operating values for the overall length of the material to be rolled. The actual operating values are values obtained as a result of operating the winder 28 based on the set operating values. In the case of the winder 28, parameters such as tension, board thickness, board width, and velocity of material to be rolled are acquired as actual operating values.

The actual energy consumption value acquisition unit 33 integrates the actual operating values to acquire an actual value $E\_DC^{ACT}$ of the energy consumption. The actual value $E\_DC^{ACT}$ of the energy consumption of the motor which drives the winder 28 is expressed as in Expression (20) like Expression (4):

$$E\_DC^{ACT}=\eta \int Pw\_DC(t)dt \qquad (20)$$

The actual energy consumption calculation unit 34 uses Expressions (21) and (22), which are model expressions similar to those (Expressions (17) and (18)) for setting calculation, to calculate an actual calculation value $E\_DC^{ACTCAL}$ of the energy consumption by substituting actual operating values in input parameters of the model expressions:

$$Pw\_DC_i^{ACTCAL}=10 \times Te^{ACT} \times h^{ACT} \times w^{ACT} \times V\_DC_i^{ACT} \qquad (21)$$

$$E\_DC^{ACTCAL}=\Sigma(Pw\_DC_i^{ACTCAL}+Pw\_DC_{i+1}^{ACTCAL}) \times S\_DC_i^{ACT}/2 \qquad (22)$$

Here, as an actual tension value, a time average value over the overall length, or a value of one aim point, or values of a plurality of aim points are used. FIG. 9 illustrates one example of set operating values and actual operating values with respect to the winder 28. A winding velocity of the winder 28 is interlocked with finishing-side velocity control during finish rolling. After finish rolling is ended, that is, after the tail edge of the material to be rolled lefts the last finishing stand, the winder 28 winds up the material to be rolled with a given velocity pattern $V\_DC^{ACT}$ 91 while maintaining a tension target value. An actual tension value in calculating the actual calculation value of the energy consumption is determined in accordance with the expression to be used for setting calculation. Accordingly, in the case of one aim point, an average value $Te^{ACT}(ave)$ 92 or a tension value at a typical aim point is used. As the board thickness and the board width, actual operating values measured by the finishing mill outlet-side measuring instrument 262 arranged at the outlet side of the rolling mill are used.

The learning value calculation unit 35 compares the actual value $E\_DC^{ACT}$ of the energy consumption acquired by the actual energy consumption value acquisition unit 33 with the actual calculation value $E\_DC^{ACTCAL}$ of the energy consumption calculated by the actual energy consumption calculation unit 34, and calculates a reference learning value ZE_DC of the energy consumption as expressed in Expression (23):

$$ZE\_DC = E\_DC^{ACT} / E\_DC^{ACTCAL} \qquad (23)$$

The pseudo-actual energy consumption calculation unit 36 uses a set operating value defined by the setting calculation unit 31 only for one parameter of the aforementioned model expression while using actual operating values collected by the actual value collection unit 32 for other parameters to calculate a pseudo-actual calculation value $E\_DC^{PseudoACTCAL}$ of the energy consumption. In the case of using the set operating value only for the velocity of the material to be rolled and using the actual operating values for tension and the like, the energy consumption is expressed as in Expressions (24) and (25):

$$Pw\_DC_i^{PseudoACTCAL\_V} = 10 \times Te^{ACT} \times h^{ACT} \times w^{ACT} \times V\_D\text{-}C_i^{CAL} \qquad (24)$$

$$E\_DC^{PseudoACTCAL\_V} = \Sigma(Pw\_DC_i^{PseudoACTCAL\_V} + Pw\_DC_{i+1}^{PseudoACTCAL\_V}) \times S\_DC_i^{ACT}/2 \qquad (25)$$

The correction learning value calculation unit 37 compares the actual calculation value $E\_DC^{ACTCAL}$ of the energy consumption calculated by the actual energy consumption calculation unit 34 with the pseudo-actual calculation value $E\_DC^{PseudoACTCAL}$ of the energy consumption calculated by the pseudo-actual energy consumption calculation unit 36 to calculate a correction learning value of the energy consumption. For example, in the case of using the set operating value for the velocity of the material to be rolled and using the actual operating values for tension and the like, the energy consumption is expressed as in Expression (26):

$$ZE\_DC(V) = E\_DC^{ACTCAL} / E\_DC^{PseudoACTCAL\_V} \qquad (26)$$

The setting calculation unit 31 calculates a corrected learning value $ZE\_DC^{use}$ by multiplying the reference learning value ZE_DC by the correction learning value ZE_DC (V) as expressed in Expression (27):

$$ZE\_DC^{use} = ZE\_DC \times ZE\_DC(V) \qquad (27)$$

The setting calculation unit 31 then inputs the various set operating values as the aforementioned various operating values of the model expressions to calculate a prediction value $E\_DC^{CAL}$ of the energy consumption for the material to be rolled, which is scheduled to be conveyed to the rolling line 1 next time or later. As expressed in Expression (19), the setting calculation unit 31 multiplies the prediction value $E\_DC^{CAL}$ by the corrected learning value $ZE\_DC^{use}$ to calculate a corrected prediction value $E\_DC^{CALSET}$ of the energy consumption.

When the model expression for calculating energy consumption has two or more parameters, the parameters may be used in combination. As illustrated in FIG. 9, as for tension, there is a difference between a set operating value $Te^{SET}$ 93 and an average value $Te^{ACT}(ave)$ 92 of the actual operating values. If the influence of this difference on the energy consumption is reflected upon the corrected learning value $ZE\_DC^{use}$, it becomes possible to achieve further improvement in prediction accuracy.

Specifically, in the case where the pseudo-actual energy consumption calculation unit 36 uses the set operating value only for the tension and uses the actual operating values for the velocity of the material to be rolled and the like, the energy consumption is expressed as in Expressions (28) and (29):

$$Pw\_DC_i^{PseudoACTCAL\_T} = 10 \times Te^{CAL} h^{ACT} \times w^{ACT} \times V\_D\text{-}C_i^{ACT} \qquad (28)$$

$$E\_DC^{PseudoACTCAL\_T} = \Sigma(Pw\_DC_i^{PseudoACTCAL\_T} + Pw\_DC_{i+1}^{PseudoACTCAL\_T}) \times S\_DC_i^{ACT}/2 \qquad (29)$$

In this case, the correction learning value calculation unit 37 calculates a correction learning value ZE_DC(T) as in Expression (30):

$$ZE\_DC(T) = E\_DC^{ACTCAL} / E\_DC^{PseudoACTCAL\_T} \qquad (30)$$

In the end, the corrected learning value $ZE\_DC^{use}$ of the energy consumption is calculated in Expression (31) in combination with the correction learning value ZE_DC(V) which is obtained by using velocity of the material to be used as a set operating value and the correction learning value ZE_DC(T) which is obtained by using tension as a set operating value. The corrected learning value $ZE\_DC^{use}$ is then applied to calculation of a prediction value $E\_DC^{CAL}_{SET}$ of the energy consumption for a next material.

$$ZE\_DC^{use} = = ZE\_DC \times ZE\_DC(V) \times ZE\_DC(T) \qquad (31)$$

It is preferable to weight ZE_DC(V) and ZE_DC(T).

It is to be noted that the second embodiment is described on the premise that the board thickness and the board width are controlled as desired over the overall length. Accordingly, an error between the set operating value and the actual operating value is small enough to be negligible.

Third Embodiment

[System Configuration of Third Embodiment]

A description is now given of a third embodiment of the present invention. The system configuration in a system of the present embodiment is similar to the configuration illustrated in FIGS. 1 to 3. Since the principal concept of the energy consumption predicting device 30 is similar to the principal concept described in the first embodiment, a detailed description is omitted.

[Prediction Calculation of Energy Consumption with Respect to Conveying Table]

Various kinds of facilities 10 of the rolling line 1 include a rolling stand of the roughing mill 23, a rolling stand of the finishing mill 26, the winder 28, and the conveying table 29. In the present embodiment, prediction calculation of the energy consumption with respect to the conveying table 29 will be described.

The conveying table 29 includes a roughing mill conveying table 290, a roughing-to-finishing conveying table 292, and a run out table 291. In the third embodiment, prediction calculation of the energy consumption with respect to the roughing mil conveying table 290 will be described as one example.

The setting calculation unit 31 defines various set operating values of the conveying table 29 based on operating conditions corresponding to the material to be rolled. Various set operating values required for setting calculation of the set operating values are prestored in the memory for each operating condition.

The setting calculation unit 31 predicts the energy consumption by inputting set operating values in model expressions. A calculation value $E\_TR^{CAL}$ of the energy consumption of a motor which drives the conveying table 29 is calculated as expressed in Expressions (32) to (34):

$$E\_TR^{CAL} = E\_TR^{CAL}_{MIN} \times E\_TR^{CAL}_{ACC\&LOAD} \quad (32)$$

$$E\_TR^{CAL}_{MIN} = \Sigma(KC(n) \times Ws \times Vs(n)^{CAL} \times t(n)^{CAL}) \quad (33)$$

$$E\_TR^{CAL}_{ACC\&LOAD} = (\tfrac{1}{2}) \times \Sigma(KAC(n) \times Ws \times (Vs(n)^{CAL})^2) \quad (34)$$

where n is a rough rolling path number, $KC(n)$ is a conveying minimum energy adjustment coefficient, $KAC(n)$ is an acceleration and deceleration energy adjustment coefficient, $Ws$ is a weight of the material to be rolled [kg], $Vs(n)^{CAL}$ is a conveying velocity of the material to be rolled [m/s], and $T(n)^{CAL}$ is a conveying time of the material to be rolled [s].

During being conveyed, the material to be rolled loses kinetic energy due to friction and the like. Expression (33) expresses the energy consumption necessary for compensating the lost energy, i.e., the energy consumption required for conveying the material to be rolled at a certain constant velocity.

Expression (34) expresses the energy consumption required for acceleration of the material to be rolled.

In the end, a prediction value $E\_TR^{CALSET}$ of energy consumption can be calculated by using a later-described corrected learning value $ZE\_TR^{use}$ as expressed in Expression (35):

$$E\_TR^{CALSET} = ZE\_TR^{use} \times E\_TR^{CAL} \quad (35)$$

A description is now given of learning calculation. Learning calculation is executed after the material to be rolled is rolled and is wound up by the winder 28.

The actual value collection unit 32 acquires actual operating values for the overall length of the material to be rolled. The actual operating values are values obtained as a result of operating the conveying table 29 based on the set operating values. For example, current consumption of a motor is acquired.

The actual energy consumption value acquisition unit 33 integrates the actual operating values to acquire an actual value $E\_TR^{ACT}$ of the energy consumption. The actual value $E\_TR^{ACT}$ of the energy consumption of the motor which drives the conveying table 29 is expressed as in Expression (36) like Expression (4):

$$E\_TR^{ACT} = \eta \int Pw\_TR(t)dt \quad (36)$$

The actual energy consumption calculation unit 34 uses Expressions (37) to (39), which are model expressions similar to those (Expressions (32) to (34)) for setting calculation, to calculate an actual calculation value $E\_TR^{ACT}_{CAL}$ of the energy consumption by substituting actual operating values in input parameters of the model expressions:

$$E\_TR^{ACTCAL} = E\_TR^{ACTCAL}_{MIN} \times E\_TR^{ACTCAL}_{ACC\&LOAD} \quad (37)$$

$$E\_TR^{ACTCAL}_{MIN} = \Sigma(KC(n) \times Ws \times Vs(n)^{ACT} \times t(n)^{ACT}) \quad (38)$$

$$E\_TR^{ACTCAL}_{ACC\&LOAD} = (\tfrac{1}{2}) \times \Sigma(KAC(n) \times Ws \times (Vs(n)^{ACT})^2) \quad (39)$$

The learning value calculation unit 35 compares the actual value $E\_TR^{ACT}$ of the energy consumption acquired by the actual energy consumption value acquisition unit 33 with the actual calculation value $E\_TR^{ACTCAL}$ of the energy consumption calculated by the actual energy consumption calculation unit 34, and calculates a reference learning value $ZE\_TR$ of the energy consumption as expressed in Expression (40):

$$ZE\_TR = E\_TR^{ACT} / E\_TR^{ACTCAL} \quad (40)$$

The pseudo-actual energy consumption calculation unit 36 uses the set operating value defined by the setting calculation unit 31 only for one parameter of the aforementioned model expression while using the actual operating values collected by the actual value collection unit 32 for other parameters to calculate a pseudo-actual calculation value $E\_TR^{PseudoACTCAL}$ of the energy consumption. As expressed in Expressions (38) and (39), the parameters with respect to the conveying table 29 include conveying velocity of the material to be rolled and conveying time of the material to be rolled. In the case of using the set operating value only for the velocity of the material to be rolled and using the actual operating value for the conveying time of the material to be rolled, the energy consumption is expressed as in Expressions (41) to (43):

$$E\_TR^{PseudoACTCAL\_V} = E\_TR_{MIN(V)} \times E\_TR_{ACC\&LOAD(V)} \quad (41)$$

$$E\_TR_{MIN}(V) = \Sigma(KC(n) \times Ws \times Vs(n)^{CAL} \times t(n)^{ACT}) \quad (42)$$

$$E\_TR_{ACC\&LOAD(V)} = (\tfrac{1}{2}) \times \Sigma(KAC(n) \times Ws \times (Vs(n)^{CAL})^2) \quad (43)$$

The correction learning value calculation unit 37 compares the actual calculation value $E\_TR^{ACTCAL}$ of the energy consumption calculated by the actual energy consumption calculation unit 34 with the pseudo-actual calculation value $E\_TR_{PseudoACTCAL}$ of the energy consumption calculated by the pseudo-actual energy consumption calculation unit 36 to calculate a correction learning value of the energy consumption. For example, in the case of using the set operating value for the conveying velocity of the material to be rolled and using the actual operating value for the conveying time of the material to be rolled, the energy consumption is expressed as in Expression (44):

$$ZE\_TR(V) = E\_TR^{ACTCAL} / E\_TR^{PseudoACTCAL\_V} \quad (44)$$

The setting calculation unit 31 then inputs the various set operating values as the aforementioned various operating values of the model expressions to calculate a prediction value $E\_TR^{CAL}$ of the energy consumption for the material to be rolled, which is scheduled to be conveyed to the rolling line 1 next time or later. As expressed in Expression (35), the setting calculation unit 31 multiplies the prediction value $E\_TR^{CAL}$ by the corrected learning value $ZE\_TR^{use}$ to calculate a corrected prediction value $E\_TR^{CALSET}$ of the energy consumption.

When the model expression for calculating energy consumption has two or more parameters, the parameters may be used in combination. In the case of using the set operating value only for the conveying time of the material to be rolled and using the actual operating value for the conveying velocity of the material to be rolled, the energy consumption is expressed as in Expressions (45) to (47):

$$E\_TR^{PseudoACTCAL\_t} = E\_TR_{MIN(t)} \times E\_TR_{ACC\&LOAD(t)} \quad (45)$$

$$E\_TR_{MIN}(t) = \Sigma(KC(n) \times Ws \times Vs(n)^{ACT} \times t(n)^{CAL}) \quad (46)$$

$$E\_TR_{ACC\&LOAD(t)} = (\tfrac{1}{2}) \times \Sigma(KAC(n) \times Ws \times (Vs(n)^{ACT})^2) \quad (47)$$

In this case, the correction learning value calculation unit 37 calculates a correction learning value ZE_TR(t) as in Expression (48):

$$ZE\_TR(t) = E\_TR^{ACTCAL}/E\_TR^{PseudoACTCAL\_t} \quad (48)$$

In the end, the corrected learning value $ZE\_TR^{use}$ of the energy consumption is calculated in Expression (49) in combination with the correction learning value ZE_TR(V) which is obtained by using the velocity of the material to be rolled as a set operating value and the correction learning value ZE_TR(t) which is obtained by using the conveying time of the material to be rolled as a set operating value. The corrected learning value $ZE\_TR^{use}$ is then applied to calculation of a prediction value $E\_TR^{CALSET}$ of the energy consumption for a next material.

$$ZE\_TR^{use} = ZE\_TR \times ZE\_TR(V) \times ZE\_TR(t) \quad (49)$$

It is preferable to weight ZE_TR(V) and ZE_TR(t).

Fourth Embodiment

[System Configuration of Fourth Embodiment]

Now, a fourth embodiment of the present invention will be described with reference to FIG. 10. A system of the present embodiment includes the configuration illustrated in FIGS. 1 and 2. Since the principal concept of the energy consumption predicting device 30 is similar to the principal concept described in the first embodiment, a detailed description is omitted.

[Characteristic Configuration of Fourth Embodiment]

Figure 10:
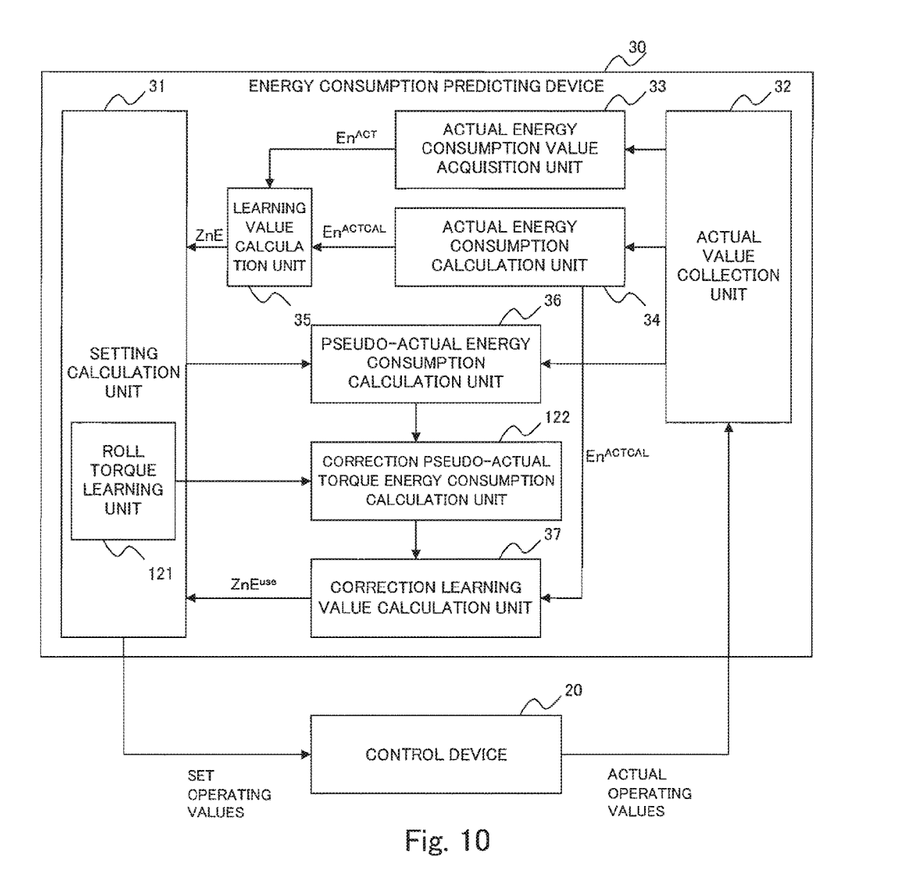
FIG. 10 is a schematic view illustrating the configuration of the energy consumption predicting device 30 according to the fourth embodiment of the present invention.

FIG. 10 is a schematic view illustrating the configuration of the energy consumption predicting device 30 according to the fourth embodiment of the present invention.

The setting calculation unit 31 includes a roll torque learning unit 121. The roll torque learning unit 121 learns roll torque learning values by using actual operating values collected by the actual value collection unit 32. For example, as expressed in Expression (50), the roll torque is a function of a rolling load Pni. A subscript n represent a stand number (or the number of rolling passes), and a subscript i is an aim point number.

$$Gn_i = G(Pn_i) \quad (50)$$

In this case, learning calculation can be expressed as follows:

$$ZGn = Gn_i^{ACT}/Gn_i^{ACTCAL} = Gn_i^{ACT}/G(Pn_i^{ACT}) \quad (51)$$

In this case, a roll torque prediction value of a next material is obtained by using the roll torque learning value to apply correction as follows:

$$Gn_i^{USE} = Gn_i^{CAL} * ZGn \quad (52)$$

Here, the roll torque actual value $Gn_i^{ACT}$ and the rolling load actual value $Pn_i$ at aim point i can be acquired from the actual value collection unit 32. The actual roll torque calculation value $Gn_i^{ACTCAL}$ can be calculated by inputting a rolling load actual value $Pn_i$ in Expression (50).

Next, a correction pseudo-actual torque energy consumption calculation unit 122 multiplies the roll torque learning value ZGn calculated by the roll torque learning unit 121 by the pseudo-actual calculation value $En^{PseudoACTCAL\_G}$ of the energy consumption calculated by the pseudo-actual energy consumption calculation unit 36 to calculate a correction torque energy consumption pseudo-actual calculation value. When the roll torque learning value ZGn is calculated in Expression (51) and is corrected in Expression (52), the correction torque energy consumption pseudo-actual calculation value $newEn^{PseudoACTCAL\_G}$ is corrected by an integrating-type calculation as expressed in Expression (53):

$$newEn^{PseudoACTCAL\_G} = En^{PseudoACTCAL\_G} * ZGn \quad (53)$$

The correction learning value calculation unit 37 compares the correction torque energy consumption pseudo-actual calculation value $newEn^{PseudoACTCAL\_G}$ calculated by the correction pseudo-actual torque energy consumption calculation unit 122 with the actual calculation value $En^{ACT\_CAL}$ of the energy consumption in the actual energy consumption calculation unit 34 to calculate a correction learning value ZnE (G):

$$ZnE(G) = En^{ACTCAL}/newEn^{PseudoACTCAL\_G} \quad (54)$$

In the end, the learnt energy consumption value is subjected to the following calculation and is then applied to a next material.

$$ZnE^{use} = ZnE \times ZnE(G) \quad (55)$$

Thus, by using correction torque energy consumption pseudo-actual calculation value, it becomes possible to calculate an energy consumption calculation learning value in consideration of the influence of a learning coefficient of the roll torque.

Although the roll torque is a function of the rolling load Pni in the above-stated Expression (50), the roll torque is not limited thereto. The roll torque may be expressed as a function having such parameters as a rolling load, an inlet-side board thickness, an outlet-side board thickness, and a torque arm coefficient.

REFERENCE SIGNS LIST 1 rolling line
10 facilities
20 control device
21 heating furnace
22 roughing mill inlet-side descaler
23 roughing mill
24 crop cut shear
25 finishing mill inlet-side descaler
26 finishing mill
27 cooling device
28 winder
29 conveying table
30 energy consumption predicting device
31 setting calculation unit
32 actual value collection unit
33 actual energy consumption value acquisition unit
34 actual energy consumption calculation unit
35 learning value calculation unit
36 pseudo-actual energy consumption calculation unit
37 correction learning value calculation unit
100 material to be rolled
121 roll torque learning unit
122 correction pseudo-actual torque energy consumption calculation unit
230, 260 rolling stands
231, 261, 281, 291 motors
262 finishing mill outlet-side measuring instrument
290 roughing mill conveying table
292 roughing-to-finishing conveying table
293 run out table

The invention claimed is:

1. An energy consumption predicting device for a rolling line having a facility operating on a material to be rolled, the device comprising:

a setting calculation unit configured to define various set operating values of the facility based on operating conditions corresponding to the material to be rolled;

an actual value collection unit configured to collect various actual operating values with respect to a result of operation of the facility based on the various set operating values;

an actual energy consumption value acquisition unit configured to integrate the various actual operating values, with a section where the facility operates on the material to be rolled being used as an integration section, to acquire an actual value of energy consumption;

an actual energy consumption calculation unit configured to input, into a model expression that defines relation between the various operating values of the facility and energy consumption of the facility, the various actual operating values as the various operating values, to calculate an actual calculation value of the energy consumption;

an energy consumption learning value calculation unit configured to divide the actual value by the actual calculation value to calculate a reference learning value of the energy consumption;

a pseudo-actual energy consumption calculation unit configured to input the set operating value defined by the setting calculation unit only in one operating value, among various operating values of the model expression, while inputting the actual operating values collected by the actual value collection unit n other operating values to calculate a pseudo-actual calculation value of the energy consumption; and a correction learning value calculation unit configured to divide the actual calculation value by the pseudo-actual calculation value to calculate a correction learning value, wherein the setting calculation unit inputs the various set operating values as the various operating values of the model expression to calculate a prediction value of the energy consumption for the material to be rolled, which is scheduled to be conveyed to the rolling line next time or later, and multiplies the prediction value by the reference learning value and the correction learning value to calculate a corrected prediction value of the energy consumption.

2. The energy consumption predicting device for a rolling line according to claim 1, wherein
the facility is a rolling stand having rollers for rolling the material to be rolled, and
the various operating values of the model expression include roll torque and roll velocity of the rollers.

3. The energy consumption predicting device for a rolling line according to claim 1, wherein
the facility is a winder, and
the various operating values of the model expression include tension and velocity of the material to be rolled.

4. The energy consumption predicting device for a rolling line according to claim 1, wherein
the facility is a conveying table, and
the various operating values of the model expression include conveying velocity of the material to be rolled and conveying time of the material to be rolled.

5. The energy consumption predicting device for a rolling line according to claim 2, further comprising:
a roll torque learning unit configured to input rolling load collected by the actual value collection unit into a relational expression that defines a relation between the roll torque and the rolling load of the facility to calculate an actual roll torque calculation value, and configured to divide an actual operating value of the roll torque collected by the actual value collection unit by the actual roll torque calculation value to calculate a roll torque learning value; and
a correction pseudo-actual torque energy consumption calculation unit configured to multiply the pseudo-actual calculation value by the roll torque learning value to calculate a new pseudo-actual calculation value, wherein
the correction learning value calculation unit divides the actual calculation value by the new pseudo-actual calculation value to calculate a correction learning value.

* * * * *